UNITED STATES PATENT OFFICE.

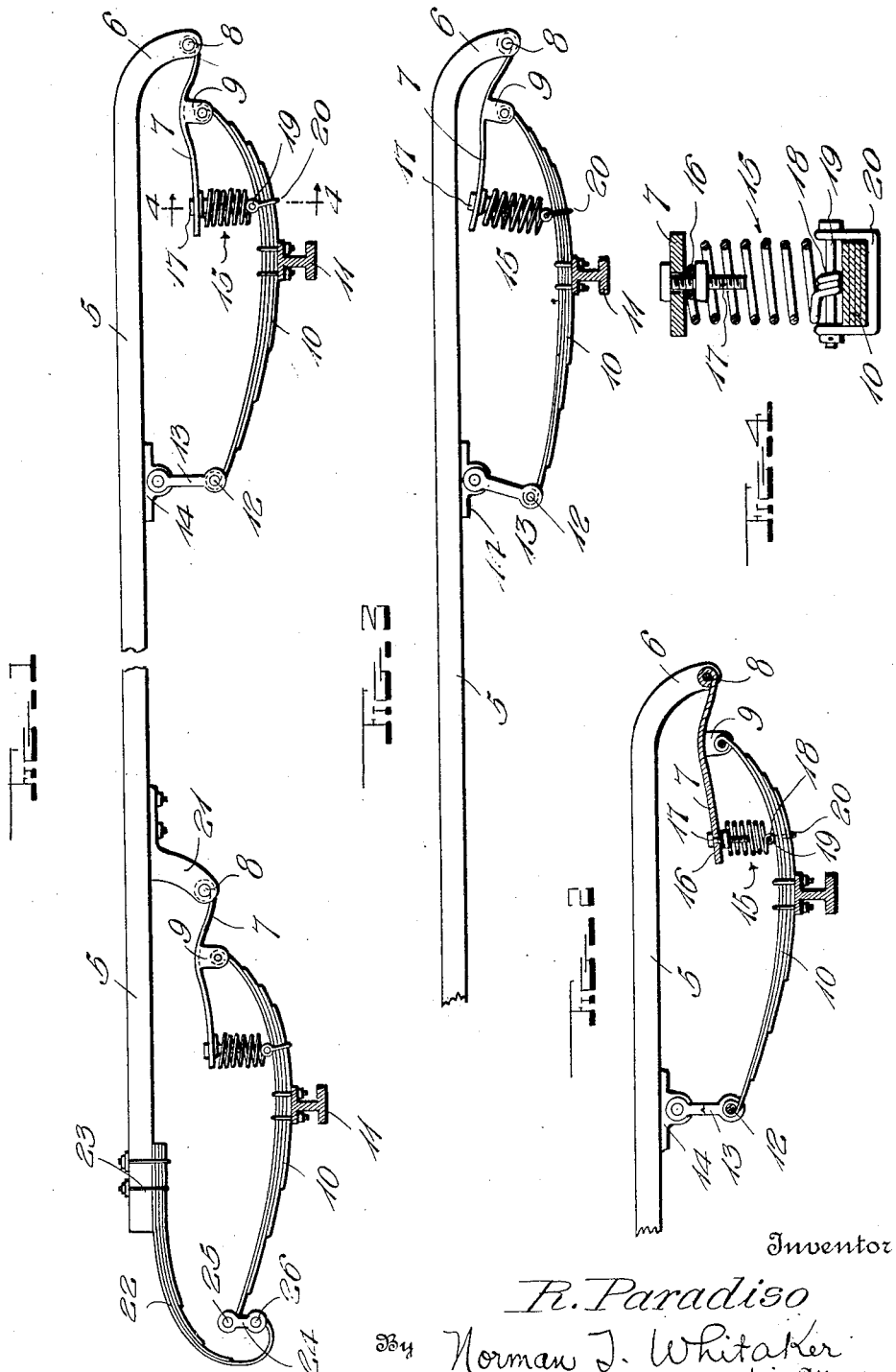

ROCCO PARADISO, OF LOS BANOS, CALIFORNIA.

SPRING SUSPENSION.

1,331,357.

Specification of Letters Patent.   Patented Feb. 17, 1920.

Application filed April 11, 1919. Serial No. 289,254.

*To all whom it may concern:*

Be it known that I, ROCCO PARADISO, a subject of the King of Italy, and a resident of Los Banos, in the county of Merced and State of California, have invented new and useful Improvements in Spring Suspensions, of which the following is a specification.

This invention relates to spring suspensions and has particular reference to that class of suspensions adapted to be used in connection with automobiles.

An important object of the invention is to provide in a suspension of the above mentioned character a means whereby excessive shocks which are ordinarily transmitted to the chassis may be absorbed, thereby eliminating any excessive strain upon the chassis and other more delicate elements of the automobile.

A further object of the invention is to provide in a spring suspension of the above mentioned class a means whereby the various elements thereof may be so positioned and proportioned with respect to each other as to produce the highest degree of flexibility regardless of size of the load and varying conditions under which the mechanism may be required to operate.

A further object of the invention is to provide a spring suspension of the class mentioned which is strong, durable and reliable in operation.

Other objects and advantages of the invention will be apparent during the course of the following description taken in connection with the accompanying drawings.

In the drawings, forming a part of the specification and in which like numerals are employed to designate like parts throughout the same, Figure 1 is a side elevation of a spring suspension embodying my invention, the suspension being shown as applied to the rear and forward ends of the automobile chassis, Fig. 2 is a longitudinal sectional view of the front spring of Fig. 1 showing the relative position of the various elements thereof, Fig. 3 is a similar view to Fig. 2, the several elements thereof being shown in the retracted positions, and, Fig. 4 is a transverse sectional view taken on line 4—4 of Fig. 1.

In the drawings, wherein for the purpose of illustration is shown a preferred form of my invention, the numeral 5 indicates a longitudinally disposed side member of an automobile chassis having its forward end curved or bent downwardly to provide a horn as shown at 6 to which is pivotally connected an arm 7 by means of a bolt 8. The arm 7 substantially intermediate its ends is provided with a pair of ears 9 to which is pivotally connected the forward end of a leaf spring 10 adapted to be connected substantially intermediate its ends to the front axle 11 of an automobile. The rear of the front spring 10 is pivotally connected as shown at 12 to a spring shackle 13, which shackle in turn is pivotally connected to a spring support 14 suitably connected to the side member 5. Between the spring 10 and the free end of the arm 7 there is interposed a coil spring 15 which terminates at its upper end in an eye 16 through which is passed a bolt 17 serving as a means for retaining the upper end of the spring in engagement with the arm 7. The lower end of the spring 15 terminates in an eye 18 adapted to receive a bolt 19 about which the spring 15 is adapted to oscillate. The bolt as is apparent is passed transversely through the arms of a spring clip 20, which clip serves as a means for retaining the lower end of the spring 15 in position upon the spring 10.

The construction, arrangement and operation of the elements of the spring suspension employed in connection with the rear end of the frame is substantially the same as that of the front spring suspension hereinbefore described, like numerals being employed to designate like parts or elements in both the front and rear suspensions. The rear suspension differs however in some particulars hereinafter described, as for example, the arm 7 is pivotally connected to a spring support 21 carried by the frame 5, which support corresponds in function to the horn 6 hereinbefore described. The rear end of the spring 10 might, if desired, be connected to the frame 5 in the manner hereinbefore described but I prefer in this instance to employ a leaf spring 22 which is secured at one end to the frame 5 as shown at 23 while the other end is bent into proximity with the rear end of the spring 10 and connected therewith by means of a shackle the links 24 thereof being pivotally connected with springs 10 and 22 as shown at 25 and 26 respectively.

From the foregoing description it is apparent that when either the front or rear axle 11 is forced upwardly as a result of sudden contact between the wheel of the automobile and an obstacle lying in the path of travel the various elements are moved to the position or to substantially the position shown in Fig. 3, a certain percentage of the shock being absorbed by the spring 10 while the remainder is taken up or absorbed by the spring 15, thereby relieving any undue stress or strain upon the chassis which would otherwise be imparted thereto.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

In a spring suspension, the combination with a frame, an axle and an interposed leaf spring arranged longitudinally with respect to said frame, of a longitudinally movable connection between one end of the spring and the frame, an arm pivotally connected to the under side of said frame and provided with a pair of depending ears intermediate the ends thereof, said spring having one end disposed between said ears and pivotally connected to said ears, and a coil spring interposed between said arm and the leaf spring, the second named spring being connected to the free end of said arm, a clip encircling the several leaves of said leaf spring, said clip serving as a means for securing the end of the second named spring to said leaf spring relatively near the axle whereby that portion of said leaf spring adjacent the axle functions as a rigid extension of the axle to resist any tendency toward yielding under the influence of the second named spring when vertical movement is imparted to said axle.

ROCCO PARADISO.